(12) United States Patent
Rosenqvist

(10) Patent No.: US 8,230,310 B2
(45) Date of Patent: Jul. 24, 2012

(54) METHOD AND APPARATUS FOR RECEIVED SIGNAL PROCESSING IN A WIRELESS COMMUNICATION RECEIVER

(75) Inventor: Anders Rosenqvist, Lund (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 308 days.

(21) Appl. No.: 12/688,404

(22) Filed: Jan. 15, 2010

(65) Prior Publication Data

US 2011/0179339 A1 Jul. 21, 2011

(51) Int. Cl.
*H03M 13/03* (2006.01)
*H04L 5/12* (2006.01)
*H04L 23/02* (2006.01)

(52) U.S. Cl. .................. 714/794; 714/796; 375/262

(58) Field of Classification Search .................. None
See application file for complete search history.

(56) References Cited

U.S. PATENT DOCUMENTS

| | | | | |
|---|---|---|---|---|
| 6,529,559 B2* | 3/2003 | Reshef | ........................ | 375/262 |
| 7,027,497 B2* | 4/2006 | Ohmori et al. | ................ | 375/229 |
| 7,480,342 B2* | 1/2009 | Wilhelmsson et al. | ....... | 375/286 |
| 8,023,581 B2* | 9/2011 | Prasad et al. | .................. | 375/262 |
| 8,045,652 B1* | 10/2011 | Bitran et al. | .................. | 375/341 |
| 2006/0029124 A1 | 2/2006 | Grant et al. | | |
| 2009/0213907 A1 | 8/2009 | Bottomley et al. | | |
| 2009/0213922 A1 | 8/2009 | Dent et al. | | |
| 2009/0310695 A1* | 12/2009 | Sawai | ........................ | 375/262 |
| 2010/0303176 A1* | 12/2010 | Lilleberg et al. | ............. | 375/341 |
| 2011/0066902 A1* | 3/2011 | Sharon et al. | ................. | 714/721 |
| 2011/0066911 A1* | 3/2011 | Yoshimoto et al. | ........... | 714/748 |

FOREIGN PATENT DOCUMENTS

WO 0169801 A2 9/2001

OTHER PUBLICATIONS

Karjalainen et al., "Iterative Frequency Domain Joint-over-Antenna Detection in Multiuser MIMO," IEEE Transactions on Wireless Communications, vol. 6, No. 10, pp. 3620-3631, Oct. 2007.

* cited by examiner

*Primary Examiner* — Guerrier Merant
(74) *Attorney, Agent, or Firm* — Coats & Bennett, PLLC

(57) ABSTRACT

According to one aspect of the teachings presented in this document, a wireless communication receiver implements a form of joint detection that is referred to as "fast joint detection" (FJD). A receiver that is specially adapted to carry out FJD processing provides an advantageous approach to joint detection processing wherein the number of computations needed to produce reliable soft bits, for subsequent turbo decoding and/or other processing, is significantly reduced. Further, the algorithms used in the implementation of FJD processing are particularly well suited for parallelization in dedicated signal processing hardware. Thus, while FJD processing is well implemented via programmable digital processors, it also suits applications where high-speed, dedicated signal processing hardware is needed or desired.

18 Claims, 5 Drawing Sheets

|  | (-3)11 | (-1)10 | (1)00 | (3)01 |
|---|---|---|---|---|
| REAL PART OF 1ST SYMBOL | A | B | C | D |
| IMAG. PART OF 1ST SYMBOL | E | F | G | H |
| REAL PART OF 2ND SYMBOL | I | J | K | L |
| IMAG. PART OF 2ND SYMBOL | M | N | O | P |

# METHOD AND APPARATUS FOR RECEIVED SIGNAL PROCESSING IN A WIRELESS COMMUNICATION RECEIVER

FIELD OF THE INVENTION

The present invention relates to wireless communications, and particularly relates to the advantageous generation of soft bit information for received communication signals.

BACKGROUND

In a Multiple-Input-Multiple-Output (MIMO) communication system, a plurality of transmitters and receivers may be operated together to increase the data throughput when radio conditions are favorable, by transmitting a plurality of data streams using the same radio frequency space as used in a single stream system. The result is increased spectrum efficiency, i.e., more bits per second per Hz, but at the cost of a technically more complicated system.

In particular, interference between individual ones of the MIMO data streams complicates MIMO reception. (In Wideband Code Division Multiple Access (WCDMA)/High Speed Downlink Packet Access (HSDPA), inter-stream interference between MIMO streams is referred to as interference and is called code reuse interference.) Joint detection (JD) and Successive Interference Cancellation (SIC) are two different principles for suppressing the interference between data streams.

As its name suggests, SIC uses a successive processing approach to interference suppression. For example, among two or more received streams, a SIC receiver may process the strongest or highest SNR stream first, and then use the results of that processing to suppress inter-stream interference in a next stream. Multiple streams thus may be processed in successive fashion, within allowable processing time limits.

As for JD processing, a JD receiver can compute the joint detection estimate of a two stream symbol vector $s=[s_0;s_1]$, in two broad steps. As a first step, the JD receiver computes an S-matrix, denoted as S. The S-matrix accounts for some statistical properties of the interference between the data streams. The receiver also computes a combined symbol vector z, which contains raw symbol estimates of the current symbol pair. Note that the S-matrix may be reused for a number of consecutive symbol vectors, especially in HSDPA, where the same S-matrix estimate may be used over a whole slot.

As a second step, the JD receiver determines, for each symbol pair, the symbol vector estimate s that maximizes the metric $\lambda(s)=-(s-z)^H S(s-z)$. The symbol vector estimate s is restricted to the possible constellation points of the two data streams respectively, where the two data streams are allowed to have different modulation constellations.

Performing joint detection on two or more MIMO data streams involving higher-order modulation constellations requires a significant number of computations, given the number of possible symbol combinations that must be considered when computing the metric. Generally, finding the data symbol combination with the best metric is a well bounded undertaking, and imposes reasonable computational requirements. However, depending upon the type of decoding in use, it often is necessary to estimate soft bits.

Obtaining these soft bits requires significantly more processing, as the metric evaluation must be extended to combinations of possible symbols "around" the combination(s) that maximize the JD metric. While some techniques, such as sphere detection, can be used to reduce the search space and, hence, the computational complexity, such techniques do not necessarily lend themselves to efficient circuit implementations. As an example, the previously mentioned sphere detection approach uses a type of conditional tree searching process that is not necessarily possible to parallelize in signal processing hardware. Nor is it necessarily possible to gauge the processing complexity of such approaches in advance.

SUMMARY

According to one aspect of the teachings presented in this document, a wireless communication receiver implements a form of joint detection that is referred to as "fast joint detection" (FJD). A receiver that is specially adapted to carry out FJD processing provides an advantageous approach to joint detection processing wherein the number of computations needed to produce reliable soft bits, for subsequent turbo decoding and/or other processing, is significantly reduced. Further, the algorithms used in the implementation of FJD processing are particularly well suited for parallelization in dedicated signal processing hardware. Thus, while FJD processing is well implemented via programmable digital processors, it also suits applications where high-speed, dedicated signal processing hardware is needed or desired.

As a non-limiting example embodiment, a wireless communication receiver comprises a receiver-front end, a symbol generator, memory, and one or more receiver processing circuits. Here, the one or more receiver processing circuits may be implemented at least in part as dedicated signal processing hardware elements. Of course, the receiver processing circuit(s) also may be implemented in whole or in part using a microprocessor or other digital processor that is specially adapted by stored computer program instructions as a circuit for carrying out FJD processing.

Continuing with the example embodiment, the receiver front-end is configured to receive concurrent symbols across a number of data streams incoming to the wireless communication receiver. In turn, the symbol generator is configured to generate symbol estimates corresponding to symbols in the data streams. Further, the memory stores a data structure configured to hold likelihood metrics, and the one or more receiver processing circuits are configured to compute a combined symbol vector of concurrently received symbols, based on the symbol estimates, and generate an estimate of inter-stream interference for the data streams.

Still further, the receiver processing circuits are configured to determine soft bit values for given symbols received in any given one of the data streams according to a fast joint detection process that is configured to, for each of one or more given symbols in the given data stream, compute a likelihood metric for each combination of possible symbol values for the given symbol and all but a remaining one of the concurrent symbols, according to one or more sets of possible symbol values. Here, for each such combination, the possible symbol value for the remaining one concurrent symbol is fixed to an intermediate conditionally best value, and the likelihood metric is computed as a function of the combined symbol vector, the estimate of inter-stream interference, and the possible symbol values included in the combination. Note that the intermediate conditionally best value is included in the combination of possible symbol values.

As part of the above FJD processing, the one or more receiver processing circuits store in the data structure the best ones of the likelihood metrics for particular values of each bit position in the given symbol. Here, the "best" metric for particular values of each bit position in the given symbol is assessed relative to the metric optimization approach. If the optimization function minimizes the metric the best metric is the minimum one. Of course, if the optimization function maximizes the metric, then the best metric is the maximum one.

In any case, the one or more receiver processing circuits may calculate soft bit values for the bit positions of the given symbol as a function of the best likelihood metrics stored in the data structure for those bit positions. And, in one or more embodiments, the wireless communication receiver further includes a turbo decoder circuit that implements a turbo decoding process. In such embodiments, the turbo decoder is configured to process the soft bit values, as determined for the given symbol according to the FJD processing, in the turbo decoding process.

In another embodiment, a method of generating soft bit values in a wireless communication receiver comprises receiving concurrent symbols across a number of data streams incoming to the receiver, computing a combined symbol vector of symbol estimates for the concurrent symbols, and generating an estimate of inter-stream interference for the data streams. The method further includes determining soft bit values for each of one or more given symbols received in any given one of the data streams, according to a fast joint detection process. That process comprises, for each such given symbol in the given data stream, computing a likelihood metric for each combination of possible symbol values for the given symbol and all but a remaining one of the concurrent symbols, according to one or more sets of possible symbol values. Here, for each combination, the possible symbol value for the remaining one concurrent symbol is fixed to an intermediate conditionally best value, and the likelihood metric is computed as a function of the combined symbol vector, the estimate of inter-stream interference, and the possible symbol values included in the combination.

The method further includes storing in a data structure best ones of the likelihood metrics corresponding to particular values of each bit position in the given symbol. Still further, the method includes calculating soft bit values for the bit positions of the given symbol as a function of the best likelihood metrics stored in the data structure for those bit positions.

Of course, the present invention is not limited to the above summary of example advantages, features, and embodiments. Those skilled in the art will appreciate further advantages, features, and embodiments upon reviewing the following detailed description and the accompanying drawings.

DETAILED DESCRIPTION

Figure 1:
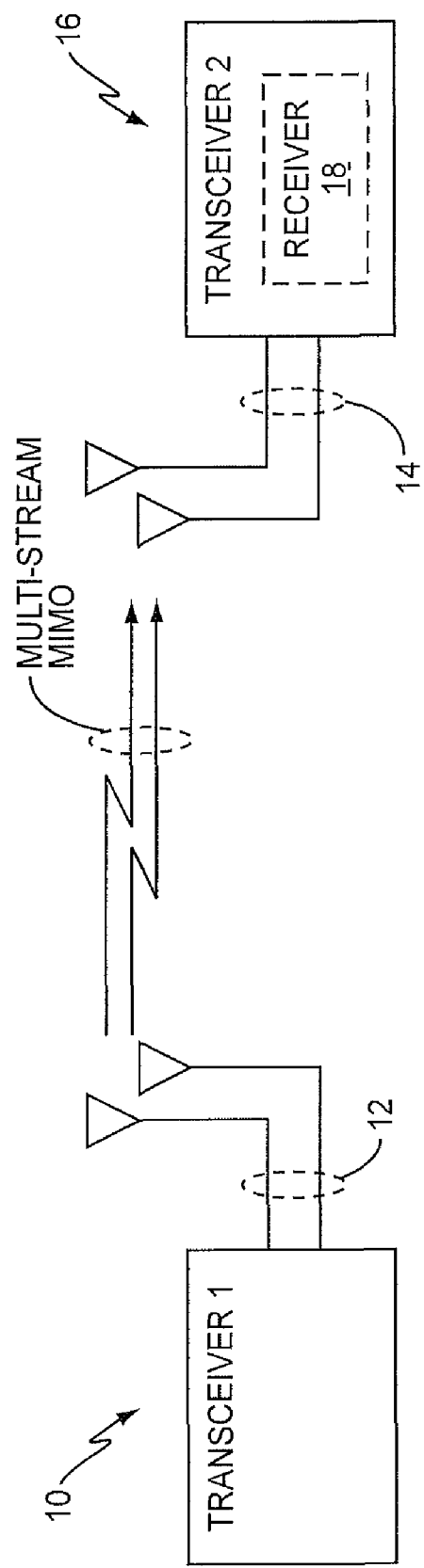
FIG. 1 is a block diagram of one embodiment of first and second transceivers, where the first transceiver transmits MIMO data streams to the second transceiver, which includes a receiver configured for Fast Joint Detection (FJD).

FIG. 1 depicts a first transceiver 10 that includes two or more antennas 12, for transmitting a multi-stream MIMO signal. The MIMO signal is received on two or more antennas 14 of a second transceiver 16. While it should be understood that the first transceiver 10 generally will include its own receiver, for example purposes, only the receiver within the second transceiver 16 is explicitly shown. In particular, one sees a receiver 18 depicted within the second transceiver 16, and it will be understood that the receiver 18 is a MIMO receiver operatively associated with the antennas 14, and configured for processing of the antenna-received, multi-stream MIMO signal.

The reader will also appreciate that as a non-limiting example, the transceiver 10 may be implemented in a NodeB, or another wireless communication network node that is configured to transmit a MIMO downlink signal to the second transceiver 16. By way of non-limiting example, the second transceiver 16 may be a cellular telephone or other mobile terminal, or a modem card, PDA, or other type of User Equipment (UE) configured for operation in a wireless communication network. Additionally, or alternatively, the receiver 18 or a variation thereof may be implemented on the network side, e.g., at the first transceiver 10.

The receiver 18 is configured as a wireless communication receiver and it comprises a receiver-front end 20 that is configured to receive concurrent symbols across a number of data streams incoming to the wireless communication receiver 18—e.g., the MIMO signal(s) received on the antennas 14 of the transceiver 16 are input to the receiver front-end 20, for any one or more of filtering, gain-control, down-conversion, digitization, etc. In operation, an example embodiment of the receiver front-end 20 provides digital sample streams corresponding to the antenna-received MIMO streams transmitted by the transceiver 10.

These digital sample streams (MIMO data streams) are input into one or more receiver processing circuits 22. In one embodiment, the receiver processing circuits 22 comprise one or more digital signal processors, ASICs, FPGAs, or other programmable processing circuits that are specially adapted to perform Fast Joint Detection (FJD) as taught herein, based on the execution of computer program instructions contained in one or more computer programs stored in (non-volatile) memory or another computer-readable medium. For example, the receiver processing circuit(s) 22 include, or otherwise have access to, FLASH, EEPROM, or other non-volatile memory holding program instructions that when executed by the receiver processing circuit(s) 22 configure them as an FJD receiver.

In another embodiment, all or at least strategic parts of the receiver processing circuit(s) 22 are implemented in dedicated signal processing hardware that is purpose-built to carry out some or all of the algorithms used to implement FJD processing. In particular, it is advantageous in some applications of FJD processing to include a vector processor within the receiver processing circuit(s) 22, for parallelized implementation of at least some parts of the FJD processing, such as the metric evaluation and optimization described in detail later herein.

Of course, those skilled in the art will appreciate that the receiver processing circuit(s) 22 may be implemented as a complex ASIC, Multi-Chip-Module, or System-on-a-Chip, which includes general and special-purpose signal processing circuitry, such that FJD processing is carried out by software-configured signal processing circuits and dedicated signal processing circuits. In any case, the depicted, example receiver processing circuits 22 include a symbol generator 24, a channel estimator 26, an impairment covariance estimator 28, a combined symbol vector generator 30, a weight generator 32, an S matrix estimator 34, and an FJD processor 40, which includes a data structure controller 42, a metric calculator 44, and a soft bit estimator 46. Further, the receiver processing circuits 22 include or are associated with one or more memory circuits 48, including memory for storing a data structure 50, used in a novel way by the FJD processing for soft bit generation.

With these non-limiting example details in mind, the symbol generator 24 is configured to generate symbol estimates corresponding to symbols in the data streams. For a WCDMA/HSDPA receiver embodiment, as an example, the symbol generator 24 comprises despreaders, e.g., a plurality of CDMA despreaders. In such an embodiment, the symbol generator 24 outputs a vector Y of the despread symbol values—i.e., the finger outputs—determined for the received symbol streams. Further, as noted, the memory 48 stores the data structure 50, which is configured to hold selected ones of the likelihood metrics generated during FJD processing.

Accordingly, the receiver processing circuits 22 are configured to compute received symbol estimates in the form of a combined symbol vector z. Here, for each symbol time or period, the vector z is determined from Y as a vector of weighted finger outputs (or weighted despread symbol values), for the concurrently received symbols in the two or more received symbol streams. The processing circuits 22 also generate an estimate of inter-stream interference matrix S for the data streams, and determine soft bit values for given symbols received in any given one of the data streams according to the FJD process taught herein. As a practical example, the symbol generator 24 comprises a G-Rake receiver circuit that includes a plurality of Rake fingers assignable to different timing offsets, and groups of these fingers are used to despread symbol values from each of two or more of the data streams of interest. In turn, the impairment covariance estimator 28 generates estimates of interference and noise correlations across the group of Rake receiver fingers being used to obtain despread symbol values for each data stream.

As an example for HSDPA in the context of wireless communication networks based on the WCDMA standards, the receiver 18 may compute the following (for example, once per slot):

$$V = R_U^{-1} H, \quad \text{(Eq. 1)}$$

$$S = H^H R_U^{-1} H, \text{ or} \quad \text{(Eq. 2)}$$

$$S = H^H V = V^H H,$$

$$W_{WLS} = V S^{-1}, \quad \text{(Eq. 3)}$$

and $$z = W_{WLS}^H Y. \quad \text{(Eq. 4)}$$

In the above expressions, H is a matrix of net channel estimates, Y is a vector of the finger outputs, and $R_U$ is the impairment covariance matrix. The channel estimator 26 may generate H according to known techniques, and, likewise, the impairment correlation estimator 28 may generate $R_U$ according to known techniques, such as known G-Rake techniques which use on-path and off-path Rake fingers to collect desired signal energy and to characterize interference and other impairment correlations for equalization.

The $R_U$ matrix values are also used by the S-matrix estimator 34 to generate the S matrix, the elements of which reflect inter-stream interference. The weight generator 32 uses the S, H, and R determinations to compute a weight matrix W. Each weight vector in the weight matrix W can be used to get one (stream-specific) estimated symbol value, and these estimated symbol values form the combined symbol vector z. Thus, at each symbol time of interest, the combined symbol vector z includes pairs, triplets, etc., of estimated symbol values $z_0$, $z_1$, etc., for two or more MIMO data streams of interest.

The combined symbol vector z and S matrix determinations are used for FJD processing. Notably, FJD processing need not be used to obtain symbol determinations and/or soft bit estimates for every MIMO stream being processed, nor is FJD processing necessarily used for every received symbol in a MIMO stream for which FJD processing is being used. As will be detailed later, the receiver processing circuits 22 may use FJD processing for one stream of interest, and then use the results obtained for that stream to drive SIC-based interference suppression in a second stream of interest. Further, even where FJD processing is being used to obtain soft bit estimates for the symbol values received in a given stream, such processing may be selectively applied per symbol time, e.g., in dependence on associated measures of noise, interference, and/or signal strength.

In any case, assuming that FJD processing is being used to obtain soft bit estimates for given symbols within a given one of two or more received data streams, the receiver processing circuits 22 are configured to, for each given symbol in the given data stream, compute a likelihood metric for each combination of possible symbol values for the given symbol and all but a remaining one of the concurrent symbols, according to one or more sets of possible symbol values. For each such combination, the possible symbol value for the remaining one concurrent symbol is fixed to an intermediate conditionally best value, and the likelihood metric is computed as a function of the combined symbol vector, the estimate of inter-stream interference, and the possible symbol values included in the combination. The receiver processing circuits 22 are further configured to store in the data structure 50 "best" ones of the likelihood metrics for particular values of each bit position in the given symbol. Still further, they are configured to calculate soft bit values for the bit positions of the given symbol as a function of the best likelihood metrics stored in the data structure for those bit positions.

Figure 2:
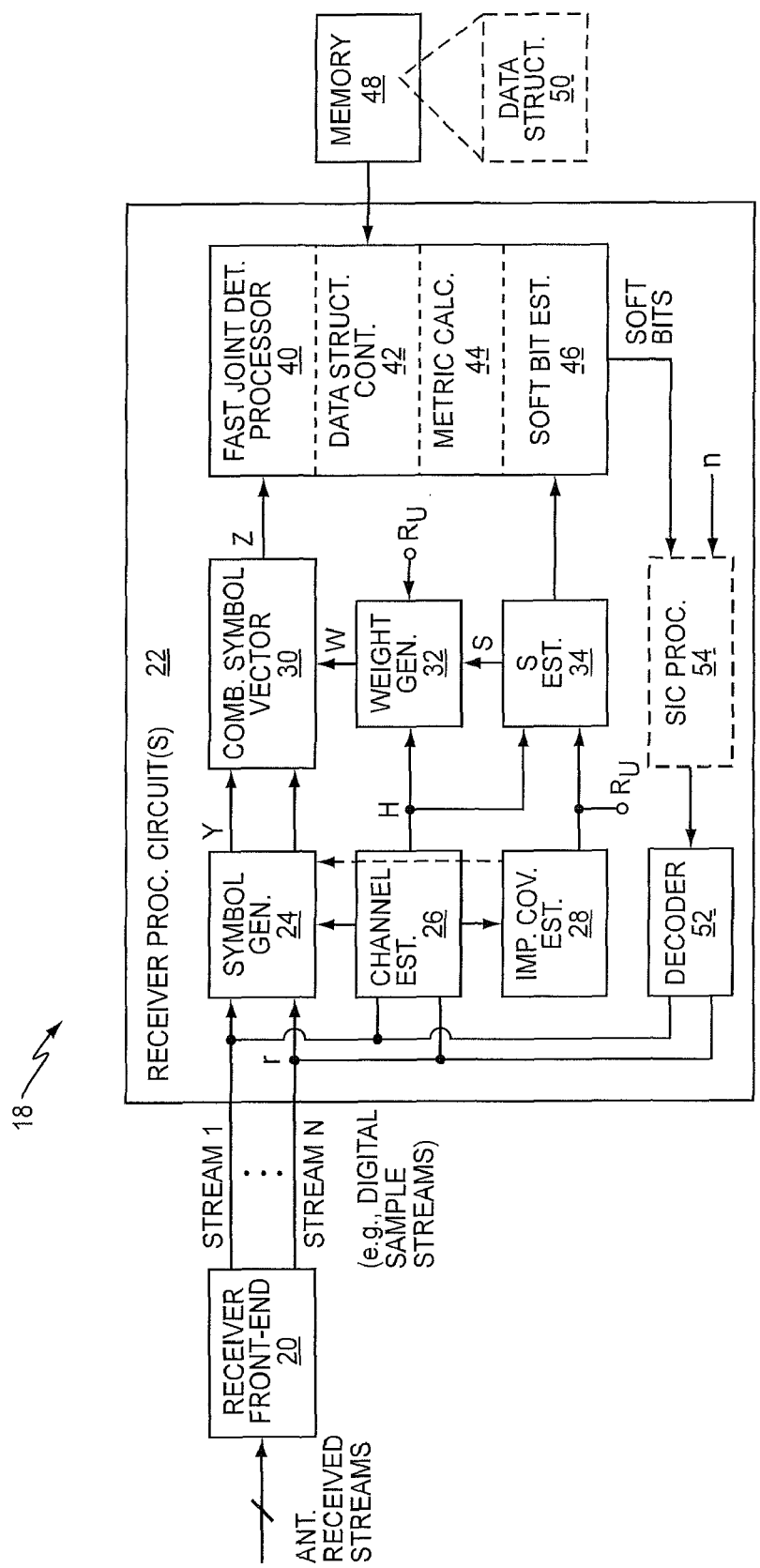
FIG. 2 is a block diagram of one embodiment of the receiver introduced in FIG. 1, for FJD processing of received MIMO data streams.

According to FIG. 2, the above processing can be carried out by the data structure controller 42, the metric calculator 44, and the soft bit estimator 46, of the FJD processor 40. Further, according to FIG. 2, the receiver 18 includes a turbo decoder circuit 52 that implements a turbo decoding process. Advantageously, the turbo decoder 52 is configured to process the soft bit values determined (via FJD processing) for the given symbols, in its turbo decoding process. The receiver processing circuits 22 further include, in one or more embodiments, a SIC processor 54, for SIC-based interference suppression. As a non-limiting example FJD may be used for one of two streams of interest, with the FJD processing results then being used for SIC-based interference suppression, for the other stream. (This approach is referred to herein as "½ FJD.")

Figure 3:
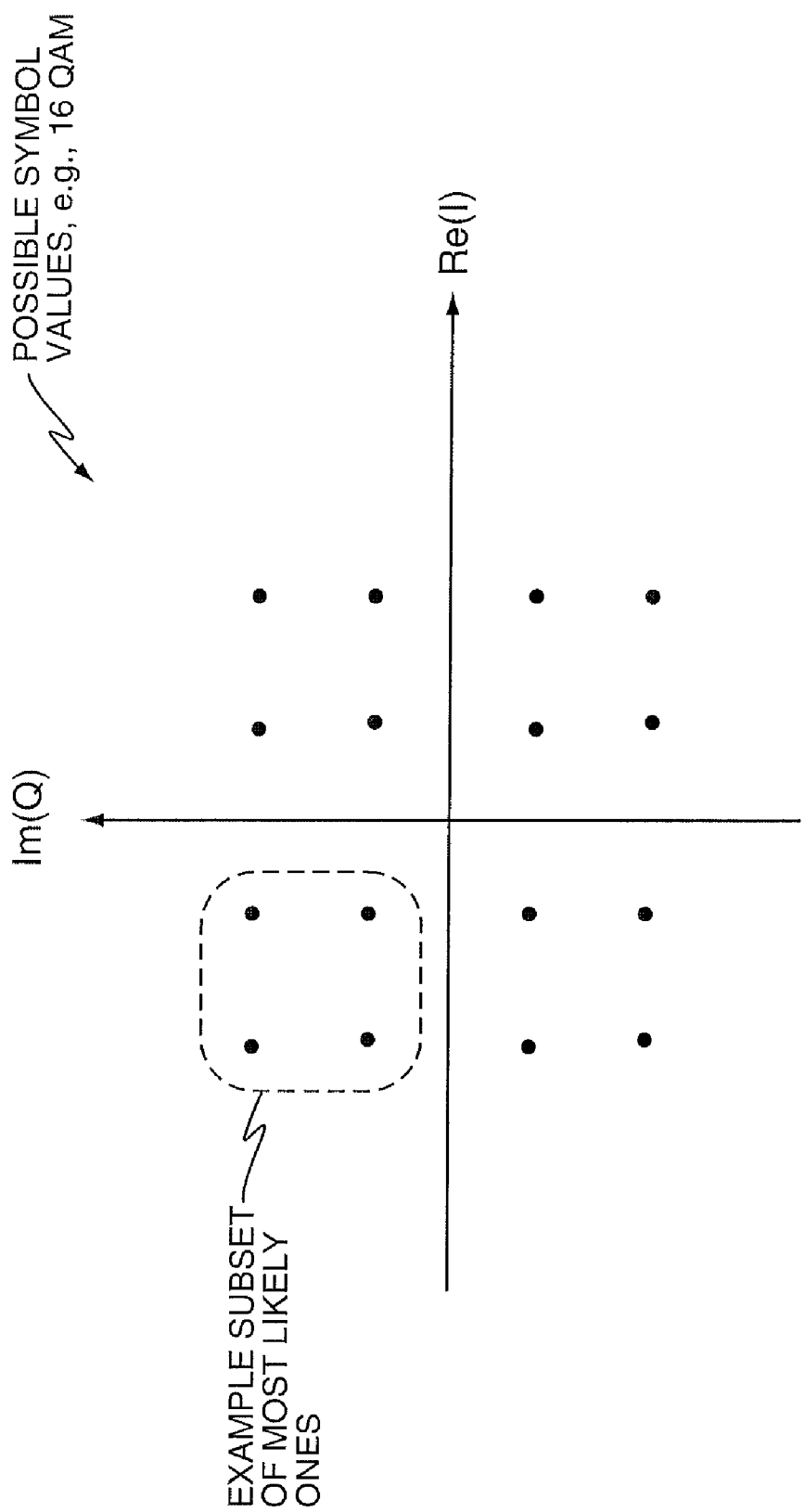
FIG. 3 is a plot of an example modulation constellation, e.g., a 16QAM constellation, indicating an example subset of defined constellation points that might be the most likely ones of the possible symbols values, corresponding to a given received symbol.

Turning back to FJD processing details, in one or more embodiments, the processing circuits 22 are configured to use, as the one or more sets of possible symbols values, a subset of most likely symbol values, as taken from the set of possible symbol values corresponding to a modulation constellation used for the given data stream. See FIG. 3 for a non-limiting example that depicts the defined, nominal set of possible symbol values for a received signal based on 16QAM. For any given received symbol, the detected symbol value will lie closest to one or more of the nominal constellation points, according to some mathematical distance measure, and such measures can be used to identify the most likely ones of the possible symbol values for which metric evaluations are performed.

Figure 4:
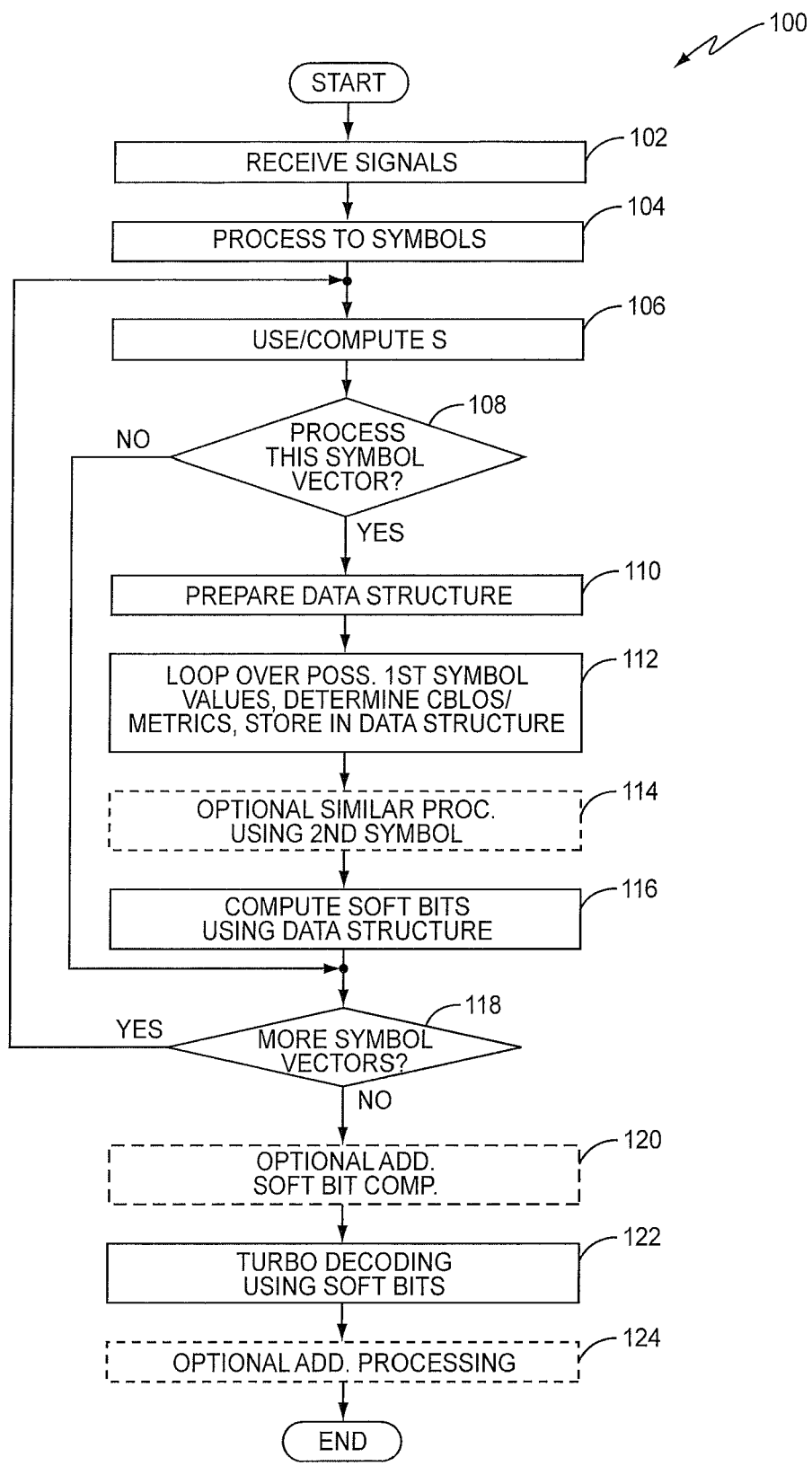
FIG. 4 is a logic flow diagram of one embodiment of FJD processing.

FIG. 4 illustrates one embodiment of the method 100 of FJD processing taught herein. To more readily understand the processing of FIG. 4, one may assume that the receiver 18 receives a symbol in a first MIMO stream concurrent with a symbol in a second MIMO stream, in each of a number of succeeding symbol times. If one uses "0" to index the first-stream symbols and "1" to index the second-stream symbols, then, for each symbol time, the receiver 18 generates a combined symbol vector $z=[z_{0x}, z_{1x}]$, where "x" denotes any given symbol time. The illustrated FJD processing can be applied to $z_{0x}$, as conditioned on $z_1$, to determine soft bits for $z_{0x}$, or can be applied to $z_{1x}$, as conditioned on $z_0$, to determine soft bits for $z_{1x}$, or can be applied to both $z_{0x}$ and $z_{1x}$.

With the above in mind, the illustrated processing begins with receiving two or more data streams (Block 102). For the example discussion, receiving two or more data streams means receiving at least two streams over at least one symbol period, such that the receiver 18 has a pair of concurrent symbol values to which FJD processing may be applied. In reality, it will be appreciated that the receiver 18 will receive many symbols over multiple symbol times, and that a combined symbol vector z can be generated and FJD-processed for each such symbol time. (Of course, symbols can be buffered and batch processed.)

Returning to the diagram, the data streams for a given symbol time are processed to determine symbol values z (Block 104), and the S-matrix is estimated, or an existing estimate is maintained from a previous estimation (Block 106). Note that the S-matrix need not be re-computed at each symbol time, as the conditions bearing on inter-stream interference generally are more slowly changing. Thus, the period or rate at which the S-matrix is re-computed may be fixed in dependence upon the transmission timing involved, e.g., WCDMA or LTE, and processing power available, or it may be dynamically adapted, based on the transmission/reception modes in use, and/or based on observations of channel conditions.

In any case, for the given combined symbol vector z, the FJD processing method determines whether to apply FJD processing (Block 108)—i.e., not every symbol in a stream of interest is necessarily processed using FJD. For example, the level of interference may be such that FJD processing is not needed or worthwhile. Assuming that FJD processing is to be applied, the method continues with preparing the data structure 50 (Block 110). Here, in at least one embodiment, "preparing" the data structure 50 includes initializing one or more of its values to default (nominal) values.

Then, regarding a first symbol from a first one of the streams represented in the combined symbol vector z, processing continues with looping over the possible combinations of symbol values, including the determination of the intermediate conditionally best value, also referred to as the conditionally best left out symbol value(s) (Block 112). The same processing may be applied with respect to the other symbol(s) in the combined symbol vector z. (In this regard, the data structure 50 is configured to include placeholders for metric values computed for the possible combinations of symbols, as taken with respect to each of the symbols in z to which FJD processing is applied (Block 114). Advantageously, the metric values stored in the data structure 50 are used to compute reliable soft bits for the symbols in z to which FJD processing was applied (Block 116).

If there are more combined symbol vectors z to process, such as where blocks of symbols are received on the MIMO streams, the next symbol vector z is processed (Yes from Block 118). If there are no more combined symbol vectors z to process, processing continues with (optional) additional soft bit processing (e.g., SIC-based processing of streams of interest for which FJD was not used for soft bit generation) (Block 120). Then, in at least one embodiment, the soft bits produced by FJD (and, optionally, the additional processing of Block 120), the soft bits are used in a turbo decoding processing (Block 122). Further, the decoded bits output from turbo decoding may be further processed (Block 124), such as for software applications running on the transceiver 16, and/or for signaling and radio transceiver control, as is known.

In more detail, the preparatory processing supporting FJD is reminiscent of that introduced for conventional JD processing, as described in the Background section of this document. For example, the first step—the estimation of the S-matrix—may be performed according to known techniques. However, FJD advantageously reduces the complexity of the second step—estimation and evaluation of the metric $\lambda(s)$—and is greatly simplified in terms of using such processing to obtain reliable soft bits. According to FJD, this second step is performed in three stages. In the first and second stages, limited searches through possible symbol combinations are performed and a special table or other data structure 50 of metric values is used. In the third stage, the contents of the data structure 50 are used to produce Log Max soft bits. For example, in a table-based implementation of the data structure 50, each row can be dedicated to the real or imaginary part of the symbol (the in-phase or quadrature component), and used to determine very reliable soft bits for that component of the symbol.

To see the algorithm details in a practical application, assume two MIMO streams, such that z is a two-row by one-column vector of combined symbol estimates $z_{0x}$ and $z_{1x}$, for each concurrently received group of symbols, where "x" denotes any given symbol period. For simplicity, one may drop the "x" designation. For any given symbol time, then, the corresponding possible symbol values for $z_0$ and $z_1$ are represented in the possible symbol vector $s=[s_0; s_1]$. With these assumptions, FJD includes computation of the weighting matrix W for determination of z, where W is determined in part based on the current estimate of the S-matrix.

Thus, for a given z, FJD evaluates, for a deterministic pattern of constellation points of the first stream symbols $s_{0i}$, the FJD metric, which is given as $$\lambda(s_i) = -(s_i - z)^H S(s_i - z). \quad \text{(Eq. 5)}$$

Here, $s_i = [s_{0i}; s_{1i}|s_{0i}]_i$ and $s_{1i}|s_{0i}$ is the best estimate of $s_1$, conditioned on the case that $s_0 = s_{0i}$. In other words, if one assumes that $s_{0i}$ is the best estimate for $y_0$ among the set of possible symbol values defined for $z_0$, then there is one among the possible constellation points $s_1$ defined for $z_1$ that is the best estimate for $z_1$. That particular $s_1$ is the intermediate conditionally best estimate, which is also referred to as the conditionally best left out symbol (CBLOS), conditioned on $s_0 = s_{0i}$. The data structure controller 42 of the FJD processor 40 can then write each resulting metric to positions in the data structure 50 that corresponds to $s_{0i}$, provided that it is greater than the actual value in that position.

Optionally, the same processing is applied to the second stream symbol $z_1$ in z. If so, the second stage of FJD processing continues with evaluating, for a deterministic pattern of constellation points of the second stream symbols $s_{1j}$, with the FJD metric expressed as $$\lambda(s_1) = -(s_j - z)^H S(s_j - z), \quad \text{(Eq. 6)}$$

where $s_j=[s_{0j}|s_{1j};s_{1j}]$ and $s_{0j}|s_{1j}$ is the best estimate (CBLOS) of $s_0$ (now being the left out symbol or LOS), conditioned that $s_1=s_{1j}$. As before, the data structure controller 42 writes each resulting metric to positions of the data structure 50 that correspond to $s_{1j}$, provided that it is greater than the actual value in that position. In the third stage of this second step in FJD processing, the soft bit estimator 44 uses the contents stored in the data structure 50 for computing Log Max soft bits, e.g., for both $s_0$ and $s_1$.

More broadly, in view of the above explanation, note that $s_{0i}$ does not have to be the best estimate of $s_0$; rather, it simply has to be an estimate of $s_0$. Of course, $s_{1i}$ must be the best estimate of $s_1$ given $s_0=s_{0i}$, but $s_{0i}$ is allowed to be suboptimal. (In fact, the contemplated processing loops over all possible $s_{0i}$ and, for each $s_{0i}$, it calculates a conditionally best left out value (CBLOS).)

Notably, however, when evaluating JD metrics, there are potentially many possible symbol value combinations to evaluate, particularly for 64QAM and other higher-order modulations. While it may be relatively straightforward to find the symbol combination that yields the best JD metric value (maximizes or minimizes, depending on the JD metric formulation), the conventional JD approach is decidedly more cumbersome when using it to determine Log Max soft bits for a given symbol, because reliable soft bit determination conventionally requires remembering evaluation results across all possible symbol combinations. FJD processing uses the data structure 50 to greatly increase the computational economy of soft-bit generation based on joint detection processing.

For example, the data structure 50 is implemented as a table (rows and columns), assuming that the modulations of the two (or more) data streams are "rectangular", i.e. the modulation pattern for each stream is built by combining an in-phase (I) branch pattern and a quadrature (Q) branch pattern. This assumption is fulfilled by QPSK, 16QAM, 64QAM, etc.

In particular, the table is used for storing selected metrics, rather than all metrics. For the case of two simultaneous data streams, there are two simultaneous complex valued data symbols, each corresponding to two real valued parameters. Thus, in total, there are four real valued parameters involved and therefore the table may have four rows—one for each parameter. The four real valued parameters can attain values independently of one another. See FIG. 5, where the data structure 50 is implemented in memory 48 as the above-described table.

Figure 5:
FIG. 5 is a diagram of an example table, as may be used to implement a stored data structure that is used to collect selected evaluation metrics generated during FJD processing.

The example table of FIG. 5 is structured for the case of two simultaneous 16QAM data streams. The corresponding Gray coded parameters are depicted with decimal values and corresponding bit vectors in the top row of FIG. 5. There are sixteen fields in the table, denoted A-P, where certain values of the FJD metric for each symbol of interest may be stored. Of course, other cases are possible. For example, the first symbol could be 16QAM and the second symbol could be QPSK. Then there would only be $2\cdot4+2\cdot2=12$ fields in the table. In another example, the first symbol could be 64QAM and the second symbol could be 16QAM. Then there would be $2\cdot8+2\cdot4=24$ fields. However, because the table is processed row wise only, and because the number of columns may not be the same on each row, it is not necessary to form the data structure 50 strictly as a table—equivalent structures can be used. Of course, table-based indexing has the advantage of being simple to implement from a processing perspective.

The "certain" metrics that are stored in the data structure 50 are selected according to an advantageous strategy. For example, referring to the table of FIG. 5, in field A, the maximum metric, for which the real part of the first symbol is −3 and for which the other three parameters may have any values, is stored. In field N, the maximum metric, for which the imaginary part of the second symbol is −1 and for which the other three parameters may have any values, is stored.

In other words, values at a certain row will correspond to maxima overall parameters except from the parameter corresponding to that row. These maxima are a sufficient basis for computing Log Max soft bits, which for a particular bit may be defined as: the maximum metric (over all symbol combinations where this particular bit is one) minus the maximum metric (over all symbol combinations where this particular bit is zero).

Thus, in at least one embodiment, the data structure 50 comprises a data table having at least first and second rows, corresponding to real and imaginary parts, respectively, of the symbols in a given data stream, and columns corresponding to different particular values or combinations of particular values possible for the bit positions in each such symbol. For each cell in the data table for which likelihood metrics were calculated, the one or more processing circuits 22 are configured to identify a best one of the likelihood metrics applicable to the particular value or values represented by that cell (and store that best metric in the cell). With this approach, to calculate soft bit values for a given bit position or positions in the given symbol, the one or more processing circuits 22 are configured to compute Log Max soft bit values by computing the difference between the best likelihood metric or metrics as determined for the given bit position or positions taking on a logical zero value and the best likelihood metric or metrics as determined for the given bit position or positions taking on a logical one value.

Continuing the 16QAM example for a two-symbol vector z that includes concurrently received symbols $z_0$ from a first symbol stream and $z_1$ from a second symbol stream, reliable soft bit values can be determined for $s_0$ and $s_1$ using the table. In particular, the maximum of field A and field B is the maximum attainable (log) likelihood, for all possible parameter combinations, where the most significant bit of the real part of the first symbol is one. In the same way, the maximum of field C and field D is the maximum attainable likelihood, for all possible parameter combinations, where the most significant bit of the real part of the first symbol is zero. Thus the soft bit for this most significant bit of the real part of the first symbol is, according to the Log Max approximation, given by $\max(A, B)-\max(C, D)$. Similarly, the soft bit for the least significant bit of the imaginary part of the second symbol is $\max(M, P)-\max(N, O)$.

By performing maximum and subtraction operations on the metric values of a row of the table, the Log Max soft bits for all the bits of the symbol component corresponding to that row may be computed. To fill the table with useful metrics, a full search of all possible symbol combinations, including the accumulation of maxima can be used, if desired. Such a full search can always be performed using $Mod_0 \cdot Mod_1$ evaluations of the metric, where $Mod_j$ is the modulation order of data stream j.

However, a complexity-reducing faster search can be used. Thus, in one or more embodiments, the FJD method uses a reduced search, such that metrics for all possible symbol combinations are not computed. Rather, the table only contains the maximum metrics for each fixed value of one dimension at a time. These maximum metrics can be found quicker, and without loss, using conditional searches rather than using a full search.

For example, field A of the table shall be given the maximum metric (over all symbol combinations where the real part of the first symbol is −3). Instead of searching through all such symbol combinations it is sufficient to compute the maximum metric (over all first stream symbols where the real part is −3 and where the second stream symbol is the best (CBLOS), in terms of metric maximization, given the first stream symbol). Similarly, field N of the table shall be given the maximum metric (over all symbol combinations where the imaginary part of the second symbol is −1). Instead of searching through all such symbol combinations it is sufficient to compute the maximum metric (over all second stream symbols where the imaginary part is −1 and where the first stream symbol is the best (CBLOS) in terms of maximizing the metric, given the second stream symbol).

For the fields A-H, the second symbol is allowed to attain any of its possible values. The maximum metrics arise when the second symbol attains its best (CBLOS) value, from the perspective of maximizing the metric, given the first symbol. The conditioning of the second symbol on the first symbol in this manner is strategic, in that the processing circuits 22 do not have to search over all possible values of the second stream symbol, when metric values for fields A-H are sought. Instead, only the first symbol, with its $Mod_0$ possibilities, has to be searched. For fields I-P, conditioning of the first symbol on the second symbol is used in a corresponding way, and the second symbol has $Mod_1$ possibilities to search through. Thus the faster, conditional, search can always be performed using $Mod_0+Mod_1$ evaluations of the metric.

The search space may be further reduced according to the most likely ones of the possible symbol values, as applicable to the given symbol. For example, for a stream where the search has been limited from its 64QAM modulation to a four-by-four set of constellation points (e.g., nearest neighbors), the table of sufficient evaluated metrics will not be full. In fact, only 4+4 out of 8+8 table entries for a 64QAM stream will be given by such a search. By not searching across all possible symbol values, but rather searching only across a subset of most likely symbol values, only those table fields corresponding to the subset of searched symbol values will have computed metric values in them. The other table fields for the given symbol will therefore not be updated or set during searching.

However, a "limit" method may be used to initialize table values, or to otherwise set table values that are not touched during searching. Using the 64QAM example, the "limit" method initializes all fields of the data structure 50, prior to searching. This initialization processing is based on a suitable "limit" value. Consequently, after the search, any given table entry will either be updated as a consequence of the searching, or will remain set to the limit value, which is determined according to the metric/modulation in use.

Thus, all soft bits may still be computed based upon table entries, whether they were actively computed via searching and corresponding metric computations, or remain set to their initialized value. As such, the magnitude of the soft bits will automatically be limited to about the absolute value of the limit metric. For the two stream case, the $limit_0$, as used for table positions corresponding to the first stream symbols, may be different from $limit_1$, as used for table positions corresponding to the second stream symbols. These limits may be computed, e.g., once per transmission time slot, using the expression $$limit_i = \frac{const}{k_i^2} S_{ii}, \quad \text{(Eq. 7)}$$

where $S_{ii}$ is the i-th diagonal element of the S matrix, $k_1=A_i/4$, and $A_i$ is the decision boundary (for symbol detection) for stream i. The constant "const" may be set to "25" as an approximate value, which is connected to the expected value of some soft bit magnitudes resulting from undefined fields when searching just a four-by-four constellation subset within the 64 constellation points defined by 64QAM. However, simulations have been performed and they indicate that values between approximately 15 and approximately 35 may be used. Hence, an approximation of 25 may be a particularly robust value to use for the 64QAM case. Those skilled in the art will be able to evaluate FJD processing results, e.g., via simulation, to obtain good values for other modulation schemes.

Thus, in one or more embodiments, the data structure controller 42 is configured to store default values in at least those positions within the data structure that correspond to particular values or combinations of values of bits that are not included in the subset of most likely symbol values. Further, in at least one embodiment, the data structure controller 42 is configured to calculate the default values as a function of the estimate of inter-stream interference.

Further, in at least one embodiment, the data structure 50 comprises a data table having at least first and second rows, corresponding to real and imaginary parts, respectively, of the symbols in a given one of the two or more received MIMO data streams, and columns corresponding to different particular values or combinations of particular values possible for the bit positions in each such symbol. Further, for each cell in the data table for which likelihood metrics were calculated, the one or more processing circuits 22 are configured to identify a best one of the likelihood metrics applicable to the particular value or values represented by that cell. As noted, that best metric value is stored in the cell, for advantageous use in Log Max soft bit generation. In particular, the soft bit estimator 46 may be configured to calculate soft bit values for a given bit position or positions in the given symbol as Log Max soft bit values by computing the difference between the best likelihood metric or metrics as determined for the given bit position or positions taking on a logical zero value and the best likelihood metric or metrics as determined for the given bit position or positions taking on a logical one value.

Broadly, then, FJD processing as taught herein is implemented according to a method that includes: (1) receiving concurrent symbols across a number of data streams incoming to a receiver; (2) computing a combined symbol vector of symbol estimates for the concurrent symbols; (3) generating an estimate of inter-stream interference for the data streams; and (4) determining soft bit values for given symbols received in any given one of the data streams according to an FJD process.

In at least one embodiment, that FJD process comprises, for each of one or more given symbols in the given data stream: (a) computing a likelihood metric for each combination of possible symbol values for the given symbol and all but a remaining one of the concurrent symbols, according to one or more sets of possible symbol values, wherein, for each combination, the possible symbol value for the remaining one concurrent symbol is fixed to an intermediate conditionally best value, and the likelihood metric is computed as a function of the combined symbol vector, the estimate of inter-stream interference, and the possible symbol values included in the combination, including the intermediate conditionally best value; (b) storing in a data structure best ones of the likelihood metrics corresponding to particular values of each bit position in the given symbol; and (c) calculating soft bit values for the bit positions of the given symbol as a function of the best likelihood metrics stored in the data structure for those bit positions. Note that in the above stepwise description of the FJD process, the "intermediate conditionally best value" for the one remaining concurrent symbol means the same thing as the CBLOS value described for the first stream (or second stream) in the two-stream example given earlier herein.

For example, assume that three streams are received concurrently, hence: z is the combined symbol estimate vector, with $z_0$ for the first stream, $z_1$ for the second stream, and $z_2$ for the third stream. Further, s is the vector of possible symbol values, where the number of possible combinations of values for $s_0$, $s_1$, and $s_2$ depends on the symbol modulation scheme(s) in use for transmission of the three streams. Here, assuming that the third stream is being conditioned on the first and second streams, the intermediate conditionally best value for $s_2$—i.e., the possible symbol values defined for the third-stream symbols is the particular defined value of $s_2$ that maximizes the FJD metric $\lambda(s)$ for a given combination of possible values for the first-stream and second-stream symbols.

In more detail, the faster, conditional FJD search is used in two stages. In stage 1, for a two-stream example, conditioning on the first stream is as follows:

$$\lambda(s) = -(s-z)^H L^H L(s-z) \quad (Eq. 8)$$
$$= -(L(s-z))^H L(s-z)$$
$$= -\|L(s-z)\|^2$$
$$= -|l_{00}(s_0-z_0)|^2 - |l_{10}(s_0-z_0)+l_{11}(s_1-z_1)|^2,$$

where L is a lower triangular Cholesky factorization of S, i.e.

$$L = \begin{bmatrix} l_{00} & 0 \\ l_{10} & l_{11} \end{bmatrix}.$$

Now, given the value of $s_{0i}$, minimize $|l_{00}(s_{0i}-z_0)|^2+|l_{10}(s_{0i}-z_0)+l_{11}(s_1-z_1)|^2$ with respect to $s_1$, which gives the same argument $s_1$ as when minimizing $|l_{10}(s_{0i}-z_0)+l_{11}(s_1-z_1)^2$, as well as $|l_{10}(s_{0i}-z_0)+l_{11}(s_1-z_1)|$, $$\left| \frac{l_{10}}{l_{11}}(s_{0i}-z_0) + (s_1-z_1) \right|,$$

and $$\left| s_1 - z_1 + \frac{l_{10}}{l_{11}}(s_{0i}-z_0) \right|,$$

all with respect to $s_1$.

The latter expression is minimized by taking $$z_1 - \frac{l_{10}}{l_{11}}(s_{0i}-z_0)$$

and mapping it to the closest constellation point for $s_1$, which will be the $s_{1i}|s_{0i}$. Here, closest means minimum distance for real and imaginary symbol parts, as determined independently of each other.

For each of the fields of the data structure 50 that correspond to $s_{0i}$ (one on each of the rows of $s_0$ when the data structure 50 is implemented as a table), the receiver processing circuits 20 write the resulting metric to the field, provided that it is greater than the value currently stored in the field.

Now, conditioning on the second stream is carried out according to computing the FJD metric as $$\lambda(s) = -(s-z)^H R^H R(s-z) \quad (Eq. 9)$$
$$= -(R(s-z))^H R(s-z)$$
$$= -\|R(s-z)\|^2$$
$$= -|r_{00}(s_0-z_0)+r_{01}(s_1-z_1)|^2 - |r_{11}(s_1-z_1)|^2,$$

where R is an upper triangular Cholesky factorization of S, i.e.

$$R = \begin{bmatrix} r_{00} & r_{01} \\ 0 & r_{11} \end{bmatrix}.$$

Given $s_{1i}$, minimize $|r_{11}(s_{1i}-z_1)|^2+|r_{01}(s_{1i}-z_1)+r_{00}(s_0-z_0)|^2$ with respect to $s_0$, which gives the same argument for $s_0$ as when minimizing $|r_{01}(s_{1i}-z_1)+r_{00}(s_0-z_0)|^2$, as well as $|r_{01}(s_{1i}-z_1)+r_{00}(s_0-z_0)|$, $$\left| \frac{r_{01}}{r_{00}}(s_{1i}-z_1) + (s_0-z_0) \right|,$$

and $$\left| s_0 - z_0 + \frac{r_{01}}{r_{00}}(s_{1i}-z_1) \right|,$$

all with respect to with respect to $s_0$.

The latter expression is minimized by taking $$z_0 - \frac{r_{01}}{r_{00}}(s_{1i}-z_1)$$

and mapping it to the closest constellation point for $s_0$, which will be $s_{0i}|s_{1i}$. For each of the fields of the table that correspond to $s_{1i}$ (one on each of the rows of $s_1$), the processing circuits 22 write the resulting metric to the field, provided that it is greater than the value currently stored in the field.

Of course, the FJD processing can be formulated for an arbitrary number of data streams. The main similarities between the example two-stream case and applications involving more than two streams, are that the data structure 50 can be structured as described (although it may be larger, e.g., having more rows), and, further, there is still one left out stream (LOS) on which the remaining streams are conditioned. However, there is now a choice of which two data streams that are computed conditioned on the others (one LOS for the first stage and another LOS for the second stage).

Let the modulations of all the n data streams involved be $Mod_0$, $Mod_1$, ..., $Mod_{n-1}$ and let the two (not necessarily unique) largest modulations be $Mod_j$ and $Mod_k$, where $j \neq k$. In the first stage of FJD, stream j is the LOS and is computed conditioned on the other streams. All streams, except for the LOS, i.e. stream j, get their necessary likelihood entries in the data structure 50.

In the second stage of FJD, stream k is the LOS and is computed conditioned on the other streams. All streams, except for the LOS, i.e. stream k, may get their necessary likelihood entries for the special table, but it will only be necessary to do the bookkeeping for stream j, which is the only one that did not get all its necessary likelihood entries during the first stage of processing.

As a more detailed example of FJD processing in the case of n streams, conditioning on the first (n−1) streams, the FJD metric computation is as follows $$\lambda(s) = -(s-z)^H L^H L(s-z) \quad \text{(Eq. 10)}$$
$$= -(L(s-z))^H L(s-z)$$
$$= -\|L(s-z)\|^2$$
$$= -\left\|\begin{array}{c} l_{00}(s_0 - z_0) \\ l_{10}(s_0 - z_0) + l_{11}(s_1 - z_1) \\ \vdots \\ l_{n-10}(s_0 - z_0) + l_{n-11}(s_1 - z_1) + \ldots + \\ l_{n-1n-2}(s_{n-2} - z_{n-2}) + l_{n-1n-1}(s_{n-1} - z_{n-1}) \end{array}\right\|^2,$$

where L is a lower triangular Cholesky factorization of S.

Further, given $s_{0i}, s_{1i}, \ldots, s_{n-2i}$, minimize $|l_{n-10}(s_0-z_0)+l_{n-11}(s_1-z_1)+ \ldots +l_{n-1n-2}(s_{n-2}-z_{n-2})+l_{n-1n-1}(s_{n-1}-z_{n-1})|$ with respect to $s_{n-1}$. Doing so gives the same argument $s_{n-1}$ as when minimizing $$\left|\sum_{c=0}^{n-2} l_{n-1c}(s_c - z_c) + l_{n-1n-1}(s_{n-1} - z_{n-1})\right|,$$

and $$\left|\sum_{c=0}^{n-2} \frac{l_{n-1c}}{l_{n-1n-1}}(s_c - z_c) + (s_{n-1} - z_{n-1})\right|,$$

all with respect to $s_{n-1}$.

The latter expression is minimized by taking $$z_{n-1} - \sum_{c=0}^{n-2} \frac{l_{n-1c}}{l_{n-1n-1}}(s_c - z_c),$$

and mapping it to the closest constellation point for $s_{n-1}$, which will be the $s_{n-1i}(s_{0i}, s_{1i}, \ldots s_{n-2i})$. Again, the minimum distance for real and imaginary parts of the symbol(s) is determined independently of each other. Further, while the above equations relate to the computation of stream j conditioned on the remaining ones of the n streams, it is shown for the case where j=n−1. All other cases can be handled, for example, by sorting the data streams or, equivalently, by defining new matrix factorizations.

In any case, the above approach yields advantageous reductions in search space/complexity. While a full search using conventional techniques would need $$\text{Mod}_j \text{Mod}_k \prod_{i \neq \{j,k\}} \text{Mod}_i$$

metric evaluations, FJD processing would, in its first and second stages, only need $$\text{Mod}_k \prod_{i \neq \{j,k\}} \text{Mod}_i + \text{Mod}_j \prod_{i \neq \{j,k\}} \text{Mod}_i$$

metric evaluations. The complexity reduction with the FJD compared to the conventional full search is, in the general case, a factor $\text{Mod}_j \cdot \text{Mod}_k/(\text{Mod}_j + \text{Mod}_k)$. For the two stream case (2×2 MIMO), where the streams are indexed as "0" for the first stream and "1" for the second stream, the complexity reduction factor is $\text{Mod}_0 \cdot \text{Mod}_1/(\text{Mod}_0 + \text{Mod}_1)$. Notably, these complexity reductions are achieved while retaining the quality of soft bit estimation. Numerical examples of complexity reduction factors for conventional JD versus FJD include these examples: a complexity reduction factor of 8, for two 16QAM streams; 12.8 for one 16QAM stream and one 64QAM stream; and 32 for two 64QAM streams. Notably, simulations have verified that the FJD processing, including the reduced-search space variant that uses only the most likely possible symbol values, yields the same soft bit estimations (or very close to in the reduced-search space variant) as can be obtained using the more complex computations and full search space associated with conventional JD.

As a further advantage, FJD is well suited for parallel implementation, e.g. on a vector processor. While not limiting, it may be particularly advantageous to implement the data structure controller 42 and metric calculator 44 in dedicated signal processing hardware, using a parallel implementation. Still further, FJD processing has direct applicability to the 2×2 MIMO case in WCDMA/HSDPA and LTE, and it is readily extended to higher numbers of streams, and to a range of modulation schemes.

Also, as noted earlier, FJD processing may be implemented according to a ½ FJD approach. As an example of ½ FJD processing in a two-stream case, FJD processing is used for generating soft bits for one or more symbols in a first stream, but is not applied to a second stream. Instead, the results of FJD processing for the first stream are used in SIC processing of the second stream symbols. In particular, the soft bit information obtained via FJD processing of the first stream improves decoding performance for the first stream, and, successfully decoded symbols or symbol blocks from the first stream may be used for better suppression of first-stream interference in the second stream symbols, within a SIC-based processor.

An example algorithm for computing the metrics for ½ FJD for a first one of two streams includes the following operations:

(1) Read the elements of the combined vector z (e.g., $z_0$, $z_1$) from memory;

(2) compute $$z_1 + \frac{l_{10}}{l_{11}} z_0;$$

(3) for a number of values of $s_{0i}$ and corresponding (possibly pre-multiplied)

$$\frac{l_{10}}{l_{11}} s_{0i},$$

compute $r_{0i} = s_{0i} - z_0$, compute $$x_i = \left(z_1 + \frac{l_{10}}{l_{11}} z_0\right) - \frac{l_{10}}{l_{11}} s_{0i},$$

and map it onto constellation points giving residual $r_{4i}$; and (4) compute metric $|l_{00}|^2 |r_{0i}|^2 + |l_{11}|^2 |r_{4i}|$ and use the real part. Any imaginary part that is not zero is a mere numerical error.

As for step (3) above, if the second stream is 16QAM, example operations for obtaining the residual $r_{4i}$ include: (1) compute the $abs(x_i)$, dimension wise (i.e. for real and imaginary parts separately; (2) where $abs(x_i) > 2$, subtract 2, dimension wise; and (3) subtract 1 everywhere, still dimension wise. If the second stream is 64QAM, the corresponding example operations include: (1) compute the $abs(x_i)$, dimension wise; (2) where $abs(x_i) > 4$, subtract 4, dimension wise; (3) where the remainder is >2, subtract 2, dimension wise; and (4) subtract 1 everywhere, still dimension wise. In an advantageous embodiment, the receiver processing circuits 22 include specialized hardware for mapping to (obtaining) residuals.

In some cases, the data throughput performance of ½ FJD can exceed that obtained by using FJD for both streams. Of course, when there are more than two streams being processed, one or more streams can be processed using FJD, and one or more can be processed using SIC.

Still further, in cases where the amount of processing power is limited, the FJD processing of groups of symbols (combined symbol vectors z) may be limited to those where the processing is expected to give the best effect. For an LTE receiver, the best effect may be achieved for those sub carriers that have the least diagonal S matrices (a diagonal S matrix indicates little or no interference between streams). It is also possible to selectively use or not use FJD processing in dependence measured energy. For example, FJD processing may be invoked for any given symbol group when one or more of those symbols is detected as having a large energy value, which indicates that there may be a substantial amount of energy "leaked" to other symbols of the group.

With the above examples in mind, those skilled in the art will readily appreciate that the present invention is not limited to the foregoing discussion, or to the accompanying drawings. Instead, the present invention is limited only by the claims and their legal equivalents.

What is claimed is:

1. A method of generating soft bit values in a wireless communication receiver comprising:
   receiving concurrent symbols across a number of data streams incoming to the receiver;
   computing a combined symbol vector of symbol estimates for the concurrent symbols;
   generating an estimate of inter-stream interference for the data streams;
   determining soft bit values for given symbols received in any given one of the data streams according to a fast joint detection process comprising, for each of one or more given symbols in the given data stream:
      computing a likelihood metric for each combination of possible symbol values for the given symbol and all but a remaining one of the concurrent symbols, according to one or more sets of possible symbol values, wherein, for each combination, the possible symbol value for the remaining one concurrent symbol is fixed to an intermediate conditionally best value, and the likelihood metric is computed as a function of the combined symbol vector, the estimate of inter-stream interference, and the possible symbol values included in the combination;
      storing in a data structure best ones of the likelihood metrics corresponding to particular values of each bit position in the given symbol; and
      calculating soft bit values for the bit positions of the given symbol as a function of the best likelihood metrics stored in the data structure for those bit positions.

2. The method of claim 1, further comprising processing the soft bit values determined for the given symbol in a turbo decoding process.

3. The method of claim 1, wherein the one or more sets of possible symbols values comprises, for at least the given data stream, a subset of most likely symbol values, as taken from the set of possible symbol values corresponding to a modulation constellation used for the given data stream.

4. The method of claim 3, further comprising storing default values in at least those positions within the data structure that correspond to particular values or combinations of values that are not included in the subset of most likely symbol values.

5. The method of claim 4, further comprising calculating the default values as a function of the estimate of inter-stream interference.

6. The method of claim 1, wherein the data structure comprises a data table having a first row corresponding to a real part of the symbols in the given data stream and a second row corresponding to an imaginary part of the symbols in the given data stream, and columns corresponding to different particular values or combinations of values of bits in the real and imaginary parts, and wherein said step of storing comprises, for each cell in the data table for which likelihood metrics were calculated, identifying the best one of the likelihood metrics applicable to the particular value or values of bits represented by that cell.

7. The method of claim 1, wherein said step of determining comprises selectively using or not using the fast joint detection process for any given symbol in the given data stream, in dependence on a measure of symbol energy or inter-stream interference associated with the given symbol.

8. The method of claim 1, wherein the data streams include a first data stream and a second data stream, and further comprising performing said fast joint detection process for one or more symbols in the first data stream, and, using the soft bit values derived from that fast joint detection process to suppress interference in the second data stream via a successive interference cancellation process applied to the second data stream.

9. The method of claim 1, wherein said step of calculating comprises, for a given bit position or positions in the given symbol, computing Log Max soft bit values by computing the difference between the best likelihood metric or metrics for the given bit position or positions taking on a logical zero value and the best likelihood metric or metrics for the given bit position or positions taking on a logical one value.

10. A wireless communication receiver comprising:
   a receiver-front end configured to receive concurrent symbols across a number of data streams incoming to the wireless communication receiver;
   a symbol generator configured to generate symbol estimates corresponding to symbols in the data streams;
   a memory storing a data structure configured to hold likelihood metrics; and
   one or more receiver processing circuits configured to:
      compute a combined symbol vector of concurrently received symbols, based on the symbol estimates;

generate an estimate of inter-stream interference for the data streams;

determine soft bit values for each of one or more given symbols received in any given one of the data streams according to a fast joint detection process configured to, for each such given symbol:

compute a likelihood metric for each combination of possible symbol values for the given symbol and all but a remaining one of the concurrent symbols, according to one or more sets of possible symbol values, wherein, for each such combination, the possible symbol value for the remaining one concurrent symbol is fixed to an intermediate conditionally best value, and the likelihood metric is computed as a function of the combined symbol vector, the estimate of inter-stream interference, and the possible symbol values included in the combination;

store in said data structure best ones of the likelihood metrics for particular values of each bit position in the given symbol; and calculate soft bit values for the bit positions of the given symbol as a function of the best likelihood metrics stored in the data structure for those bit positions.

11. The wireless communication receiver of claim 10, wherein the wireless communication receiver includes a turbo decoder circuit that implements a turbo decoding process, and wherein the turbo decoder is configured to process the soft bit values determined for the given symbol in said turbo decoding process.

12. The wireless communication receiver of claim 10, wherein the one or more processing circuits are configured to use, as the one or more sets of possible symbols values, a subset of most likely symbol values, as taken from the set of possible symbol values corresponding to a modulation constellation used for the given data stream.

13. The wireless communication receiver of claim 12, wherein the one or more processing circuits further comprise a data structure controller that is configured to store default values in at least those positions within the data structure that correspond to particular values or combinations of values of bits that are not included in the subset of most likely symbol values.

14. The wireless communication receiver of claim 13, wherein the data structure controller is configured to calculate the default values as a function of the estimate of inter-stream interference.

15. The wireless communication receiver of claim 10, wherein the data structure comprises a data table having at least first and second rows, corresponding to real and imaginary parts, respectively, of the symbols in the given data stream, and columns corresponding to different particular values or combinations of particular values possible for the bit positions in each such symbol, and wherein, for each cell in the data table for which likelihood metrics were calculated, the one or more processing circuits are configured to identify a best one of the likelihood metrics applicable to the particular value or values represented by that cell.

16. The wireless communication receiver of claim 10, wherein the one or more processing circuits are configured to selectively use or not use the fast joint detection process for determining the soft bit values for any given symbol in the given data stream, in dependence on an estimate of symbol energy or inter-stream interference associated with the given symbol.

17. The wireless communication receiver of claim 10, wherein the data streams include a first data stream and a second data stream, and wherein the one or more processing circuits are configured to perform said fast joint detection process for one or more symbols in the first data stream, and, use the soft bit values derived from that fast joint detection process to suppress interference in the second data stream via a successive interference cancellation process applied to the second data stream.

18. The wireless communication receiver of claim 10, wherein to calculate soft bit values for a given bit position or positions in the given symbol, the one or more processing circuits are configured to compute Log Max soft bit values by computing the difference between the best likelihood metric or metrics as determined for the given bit position or positions taking on a logical zero value and the best likelihood metric or metrics as determined for the given bit position or positions taking on a logical one value.

* * * * *

UNITED STATES PATENT AND TRADEMARK OFFICE
CERTIFICATE OF CORRECTION

PATENT NO. : 8,230,310 B2  
APPLICATION NO. : 12/688404  
DATED : July 24, 2012  
INVENTOR(S) : Rosenqvist Page 1 of 1

It is certified that error appears in the above-identified patent and that said Letters Patent is hereby corrected as shown below:

On the Face Page, in Field (73), under "Assignee", in Column 1, Line 1, delete "Ericsson," and insert -- Ericsson (publ), --, therefor.

In Column 8, Line 67, in Equation (6), delete "$\lambda(s_1)$" and insert -- $\lambda(s_j)$ --, therefor.

In Column 12, Line 1, delete "$k_1$" and insert -- $k_i$ --, therefor.

In Column 13, Line 42, delete "$(s_1-z_1)^2$," and insert -- $(s_1-z_1)|^2$, --, therefor.

Signed and Sealed this  
Twenty-seventh Day of November, 2012

David J. Kappos  
*Director of the United States Patent and Trademark Office*